US005857070A

United States Patent [19]
Satterfield et al.

[11] Patent Number: 5,857,070
[45] Date of Patent: Jan. 5, 1999

[54] METHOD FOR LOCATING ERRORS IN A COMPUTER PROGRAM

[75] Inventors: Wade Satterfield; John Diamant; Timothy J. Duesing, all of Fort Collins, Colo.

[73] Assignee: Hewlett-Packard Company, Palo Alto, Calif.

[21] Appl. No.: 755,211

[22] Filed: Nov. 22, 1996

[51] Int. Cl.$^6$ ..................................................... G06F 11/00
[52] U.S. Cl. ................................. 395/183.14; 395/185.01
[58] Field of Search ............................. 395/183.14, 704, 395/701, 705, 708, 185.01, 183.13, 183.15

[56] References Cited

U.S. PATENT DOCUMENTS

| | | | |
|---|---|---|---|
| 5,280,617 | 1/1994 | Brender et al. | 395/700 |
| 5,404,321 | 4/1995 | Mattox | 364/709.01 |
| 5,487,147 | 1/1996 | Brisson | 395/180 |
| 5,495,571 | 2/1996 | Corrie, Jr. et al. | 395/183.14 |
| 5,544,262 | 8/1996 | Pagallo | 382/189 |
| 5,581,696 | 12/1996 | Kolawa et al. | 395/183.14 |
| 5,583,988 | 12/1996 | Crank et al. | 395/185.01 |
| 5,617,533 | 4/1997 | Wu et al. | 395/183.14 |
| 5,644,770 | 7/1997 | Burke et al. | 395/710 |

OTHER PUBLICATIONS

Duby, Carolyn K. et al., "CCEL: A Metalanguage for C++", Department of Computer Science, Brown University, Providence, RI, Oct. 1992.

Meyers, Scott et al., "Automatic Detection of C++ Programming Errors: Initial Thoughts on a lint++", Department of Computer Science, Brown University, Providence, RI, 1991, pp. 29–40.

Primary Examiner—Joseph Palys

[57] ABSTRACT

A system that automatically detects logical errors when compiling a program. The system detects such logical errors as a signal handler routine modifying the errno global variable, a signal handler routine calling a non-reentrant library function, a signal handler routine calling a non-reentrant user function, and a signal handler routine calling a memory allocation function without first disabling all other signal handlers. The system also detects using "/n" at the end of a string.

21 Claims, 11 Drawing Sheets

METHOD FOR LOCATING ERRORS IN A COMPUTER PROGRAM

FIELD OF THE INVENTION

This invention relates to computer systems and more particularly to programming languages within such computer systems. Even more particularly, the invention relates to detecting logical programming errors within programs written using such programming languages.

BACKGROUND OF THE INVENTION

Compilers for programming languages within computer systems routinely check for syntax errors before they will attempt to compile a program. This type of checking may be done prior to the compilation process or it may be done as part of the compilation process. Syntax errors include such things as misspelled key words, unbalanced parenthesis, undefined variables, etc. The newest compilers even combine a text editor with the compiler so that syntax is checked when a programming statement is typed in by a programmer. This allows the errors to be detected at the earliest possible moment.

While syntax error checking is very important, and must be performed if a program is to compile, it is desirable that checking for logical errors also be performed. Logical errors include performing statements in a illogical sequence, failing to perform statements that need to be performed, and even includes such things as typographical errors that would otherwise go undetected because they are syntactically correct. Most textbooks that teach how to use a programming language also include suggestions on avoiding many types of logical errors. Some books have been entirely devoted to the teaching of ways to avoid logical errors, for example, "Effective C++" by Scott Meyers, Addison Wesley Publishing Company, 1992. The subtitle of this book is "50 Specific Ways to Improve Your Programs and Designs". This same author, Scott Meyers, has also written other books and articles on detection of programming errors, such as "Automatic Detection of C++ Programming errors: initial Thoughts on a lint++", published at the 1991 USENIX Conference.

While books have suggested some errors, and some compilers and text editors include checking for a few of these errors, many more are not identified in books and have yet to be programmatically implemented. While books are an effective teaching tool, no one reads every book, so a computer implementation of the rules is a vast improvement over simply mentioning the rules within a book. Furthermore, books teach people how to avoid these problems, but they seldom provide a logical method whereby a program can perform an automatic check to detect a rule violation.

There is need in the art then, for an improved method for detecting logical errors within a program. There is further need in the art, for a system that will detect many logical errors and inform a programmer when these logical errors are committed. The present invention meets these and other needs in the art.

SUMMARY OF THE INVENTION

It is an aspect of the present invention to detect errors within a computer program.

It is another aspect of the invention to detect logical programming errors wherein correct programming statements are entered in an illogical order.

The above and other aspects of the invention are accomplished in a system that automatically detects many logical errors after compiling the source code of a programming language. The present invention will detect such logical errors as a signal handler routine modifying the "errno" global variable, a signal handler routine calling a non-reentrant library function, a signal handler routine calling a non-reentrant user function, and a signal handler routine calling a memory allocation function without first protecting the call from being disturbed by any other signal handler. The present invention will also detect likely typographical errors such as using a "/n" at the end of a string as opposed to a "\n", which is part of the language definition, but not a syntax error when mistyped.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
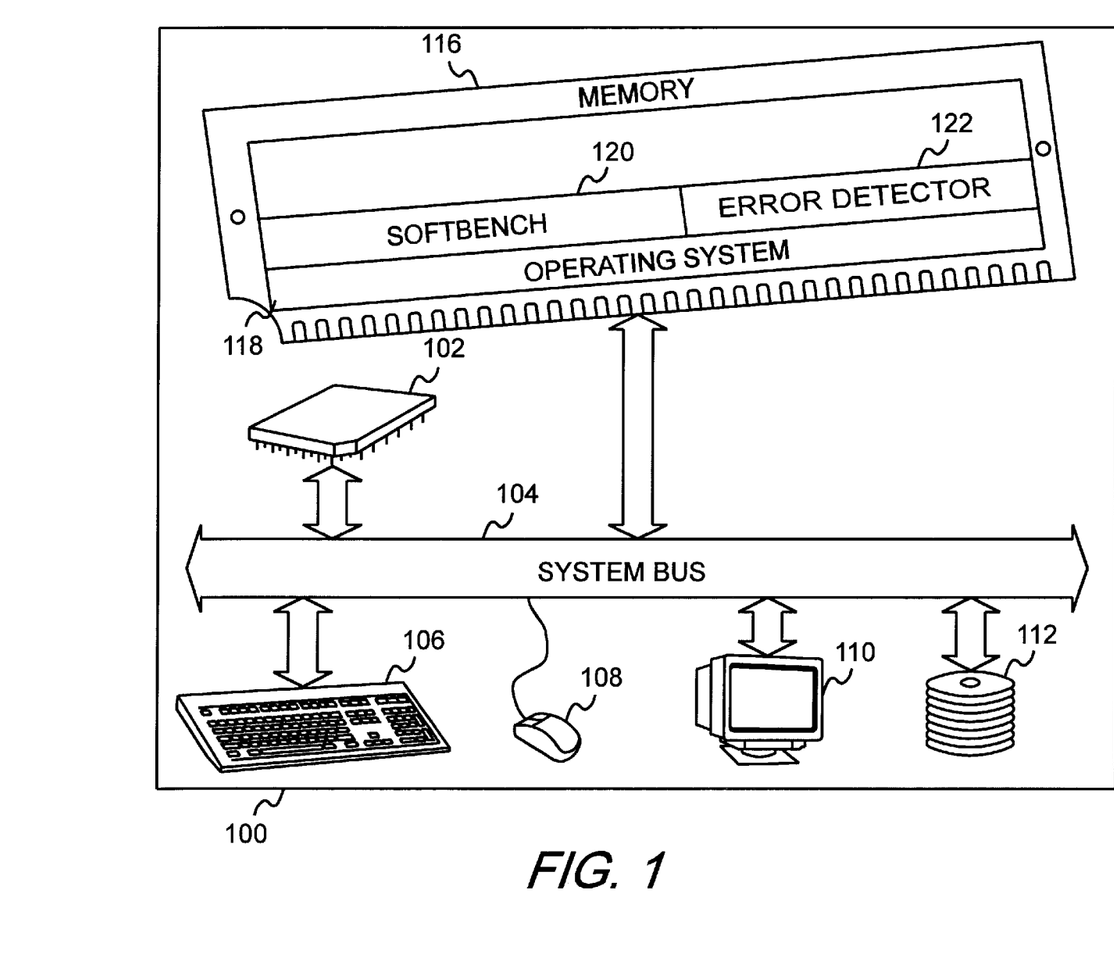
FIG. 1 shows a computer system incorporating the error detection method of the present invention.

FIG. 1 shows a block diagram of a computer system that incorporates the error detection method of the present invention. Referring now to FIG. 1, a computer system 100 contains a processor 102 that communicates to other elements of the computer system 100 over a system bus 104. A keyboard 106 and a mouse 108 allow input to the computer system 100 and a display device 110 allows software within the computer system 100 to output text and graphical information to a user of the computer system 100. A disk 112 stores the software and data of the present invention.

A memory 116 contains an operating system 118, which may be any one of a number of operating systems, such as the Unix(tm) Operating System, the Microsoft Windows Operating System, or other operating systems. The memory 116 also contains the SoftBench system 120, which provides a compiler and a softcheck utility that contains the error detector 122 of the present invention.

In operation, a user of the computer system 100 loads the softbench system 120 through the operating system 118. The user then enters source code for a computer program by typing source code lines of the computer program on the keyboard 106 or by loading previously typed in programs from the disk 112. The user then commands the softbench system 120 to run the Softcheck utility to analyze the programs that have been entered. One of the steps of the softcheck utility within the softbench system 120 is to call the error detector 122 of the present invention.

Figure 2:
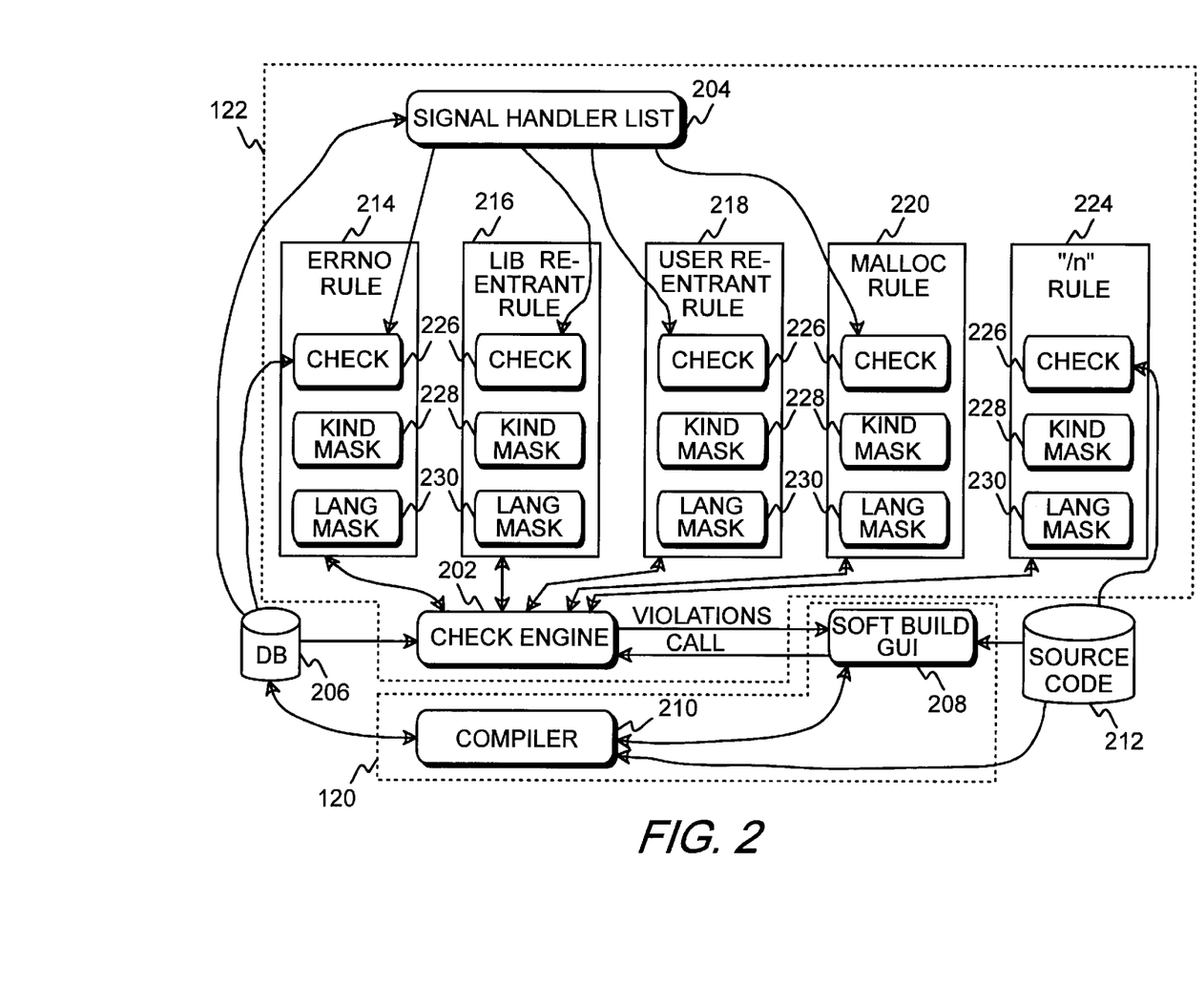
FIG. 2 shows a block diagram of the high level operation of the compiler and error detection method of FIG. 1.

FIG. 2 shows a block diagram of the high level operation of the softbench system 120 and the error detector 122 of FIG. 1. Referring now to FIG. 2, the user interacts with the system through the Graphical User Interface (GUI) system 208 to request that a compiler 210 compile their program, and to request that the error detector 122, also called a softcheck utility, analyze their program. During the parsing process, the compiler 210 separates each symbol within the users program and builds a database 206 of the symbols. Within the database 206, each symbol is identified with a "kind" indicator. The kind indicator identifies the kind of symbol, for example, the symbol might be a variable, or it might be a function name, etc. This type of separation of the symbols and identifying their kind is typical in all commercially available compilers, and is well known in the art. A description of the database 206 is contained in Appendix A attached hereto and incorporated herein by reference.

The softcheck utility 122 contains a check engine 204 that searches the database 206 for the symbols within the user's program and passes the symbols of interest on to the rules for processing. To determine which symbols are of interest, the check engine 204 calls the kindmask method 228 of each rule 214, 216, 218, 220, and 224 to determine the kinds of symbols the rule wants from the check engine 204. For the remaining rules, the check engine 204 searches the database 206 and each time a new symbol is found, the check engine 204 calls the kindmask method 228 of each rule to check for a match between the symbol found and the kind of symbol the rule can process.

When a match occurs between the kind of symbol that a rule can process, and the kind of the symbol retrieved by check engine 202, check engine 202 calls the rule to process the particular kind of symbol. Each of the rules contained within the present invention is explained below with respect to one or more of the remaining FIGS. 3–10 of the present invention. Check engine 202 will call the appropriate FIGS. 3–10 depending upon the kind of symbol retrieved. For some rules, the rule is called once to process all symbols.

In the preferred embodiment of the present invention, each rule is written as a class within the C++ programming language. One of the methods of each rule class is a method called the "kindmask" and when called, this method returns an indicator of the kind of symbol the rule will process. Another method within each rule class is called the language mask or "langmask" and when this method is called it returns an indicator of the particular language that the rule will process. The method of each rule that is called by check engine 202 to perform the actual rule checking is called the "check" method 226. The following figures are flowcharts of the check method within the various rules defined within the present invention.

Figure 3:
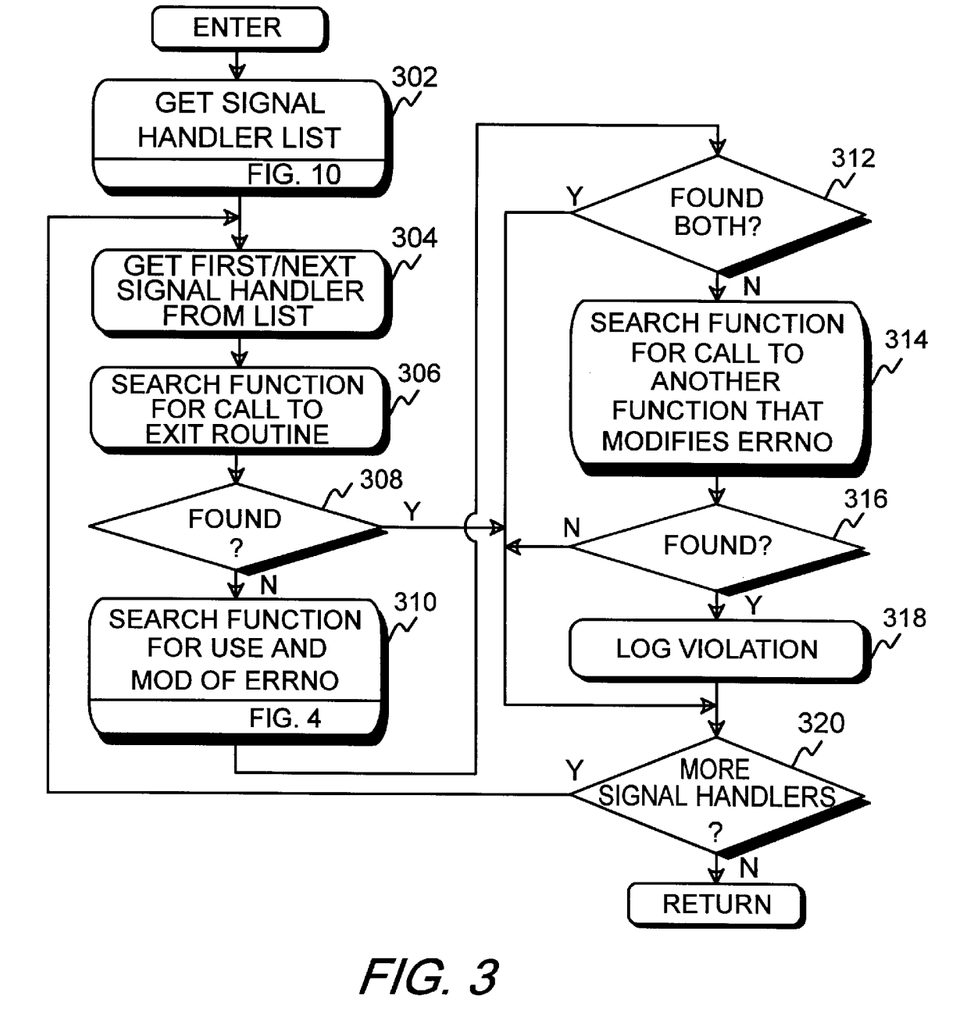
FIGS. 3 and 4 show a flowchart of a method for detecting signal handler routines that modify a global error variable.

FIG. 3 shows a flowchart for the check method of a rule 214 that determines whether signal handler functions modify the global error variable "errno". The variable errno is a global variable that is used to return an error code to a calling program. A signal handler is typically called by the occurrence of some event external to the program, therefore, when a signal handler is called, operation of the program is interrupted to allow the signal handler to process. Because the program has been interrupted, and may return, errno may contain data still needed by the program, so the signal handler cannot modify the contents of the variable errno without potentially causing an error within the program.

This method is called by the check engine 202 once before processing other rules, because the softcheck utility has no way to identify signal handler functions apart from other functions. Referring to FIG. 3, after entry, block 302 calls FIG. 10 to get a list of signal handler functions. Block 304 then gets the first, or next, signal handler function from the list, so that it can be processed. Block 306 searches a database, built by the parser 120, that contains the symbols of the function, to determine whether the function calls an exit routine. This is done by examining the symbols to determine if any are function calls that call "exit" or "_exit", which are exit routines within the C programming language.

If the signal handler function calls an exit routine, the signal handler will not return to the program that was interrupted when the signal handler was called, therefore the error condition being checked has not occurred. Thus, if block 308 determines that block 306 did find a call, either directly or indirectly, to an exit routine, block 308 goes to block 320.

Figure 4:
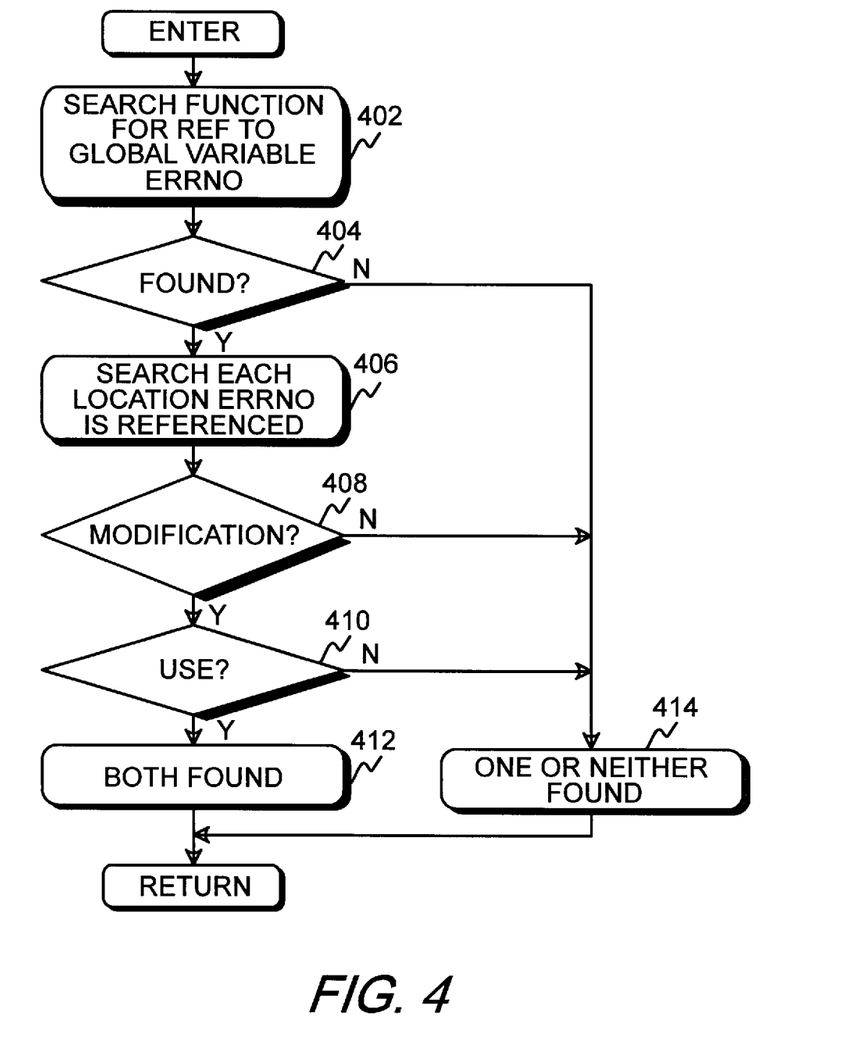

If a call to an exit routine was not found, block 308 transfers to block 310 which calls FIG. 4 to search the function to determine whether there is both a use and a modification of the variable errno. If there is both a use and a modification, the present invention assumes that the use was to save errno before a call to a function that is known to modify errno, and the modification was to restore errno after the return from the function that is known to modify errno. Therefore, if both a use and a modification of errno are found, there is no problem of this class and block 312 returns to the caller.

If both a use and a modification are not found, block 312 transfers to block 314 which searches the signal handler function to determine whether the function calls another function, directly or indirectly, that modifies errno. This is done by matching the calls within the signal handler to functions that are known to modify errno. The list of functions that are known to modify errno is determined by examining the documentation of all those functions and simply building a list of those that modify errno. This examining can be done by another program or done manually.

Therefore, block 314 evaluates each function call within the signal handler function being examined, to determine whether the name of the function being called matches one of the names in the list of those functions that modify errno, or if it is a function that calls a function that modifies errno. If there is no match between the functions being called, directly or indirectly, and the functions within the list, block 316 simply returns to the caller since there is no potential violation. If, however, one of the function calls within the signal handler function matches one of the names within the list that modifies errno, block 316 transfers to block 318 which logs a violation indicating that this signal handler function modifies errno. Logged violations are typically displayed as warning or error messages to a user of the system through the GUI, however, those skilled in the art will recognize that violations could be used to prevent compilation of the program, or could be used to prevent some other physical action from occurring.

Control then goes to block 320 which determines if there are more signal handler functions to process, and if so, block 320 returns to block 304 to process the next signal handler function. After all signal handler functions have been processed, block 320 returns to the caller.

FIG. 4 shows a flowchart of the search function for use and modifications of errno called from block 306 of FIG. 3. Referring now to FIG. 4, after entry, block 402 searches the function for any reference to the global variable errno. Block 404 then determines if any reference to errno was found, and if none is found, block 404 transfers to block 414 which returns an indication that both a use and a modification was not found.

If some reference to errno has been found, block 404 transfers to block 406 which searches each location where an errno reference occurred to determine whether errno is modified or used. Block 404 determines whether the reference is a modification and if no references have been modified, then block 408 transfers to block 414 to return an indication that both a use and a modification was not found.

If at least one modification was found, block 408 transfers to block 410 which determines whether a use was also found and if not, block 410 transfers to block 414 which returns an indication that one or neither was found. If a use was found, block 410 transfers to block 412 which returns the indication that both a modification and a use were found within the function.

Figure 5:
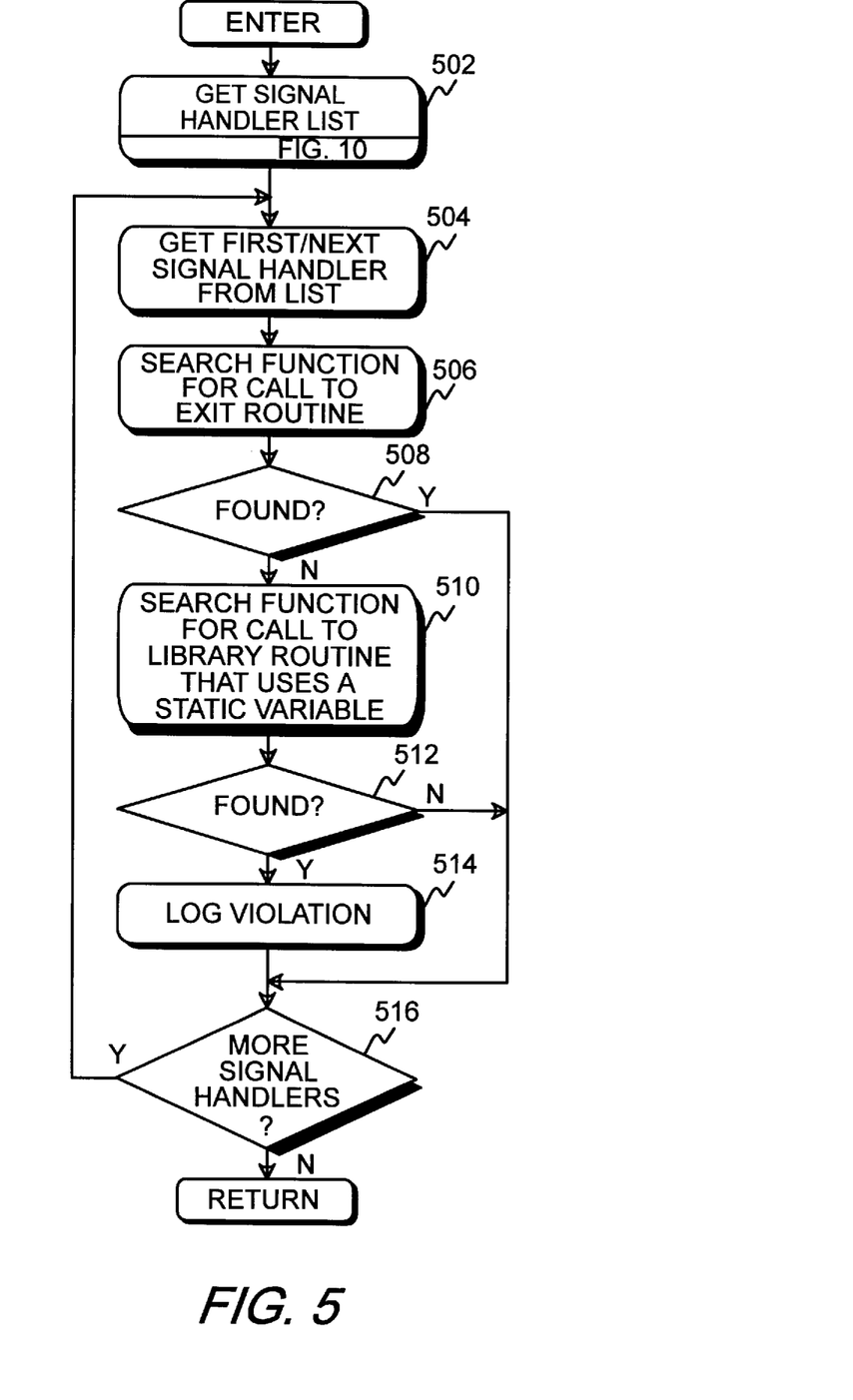
FIG. 5 shows a flowchart of a method for detecting signal handler routines that call non-reentrant library functions.

FIG. 5 shows a flowchart for the rule 216 (FIG. 2) that checks to determine whether signal handlers call any non-reentrant library functions. This rule is also called once by check engine 202. Referring now to FIG. 5, after entry, block 502 calls FIG. 10 to get a list of signal handler functions. Block 504 then gets the first, or next, signal handler function from the list. Block 506 searches the function for any call to an exit routine and if one is found, block 504 returns since the signal handler will exit without returning, and no error can occur even if the signal handler calls a non-reentrant library function.

If no exit routines are found, control goes to block 510 which searches the function for any call to a library routine that is not reentrant. This search is done by looking for each function call within the signal handler function and comparing the name of the function being called to the names in a list of library functions that are known to not be reentrant. The search is also recursive in that each called function found is also searched to determine if it calls a non-reentrant library function, and each function within that function is searched, etc. One method for creating this list is to examine the documentation, called "man" pages, of all library functions and identify each of those library functions that use a static variable, or return a pointer to a static variable, or claim to use static variables, as not being reentrant. Other indications that a function is not reentrant may also be present within a function.

If the signal handler function does not call any library routine in the list, block 512 returns to the caller since it is only using library functions that are reentrant. If, however, the signal handler function calls a library routine that is in the list, block 512 transfers to block 514 which logs a violation since any library routine that is in the list is not reentrant and therefore the signal handler may cause an error if the program is in that library function when a signal is caught.

Block 516 then determines if more signal handler functions need to be analyzed and, if so, transfers to block 504 to get the next signal handler function. After all signal handler functions have been processed, block 516 returns to the caller.

Figure 6:
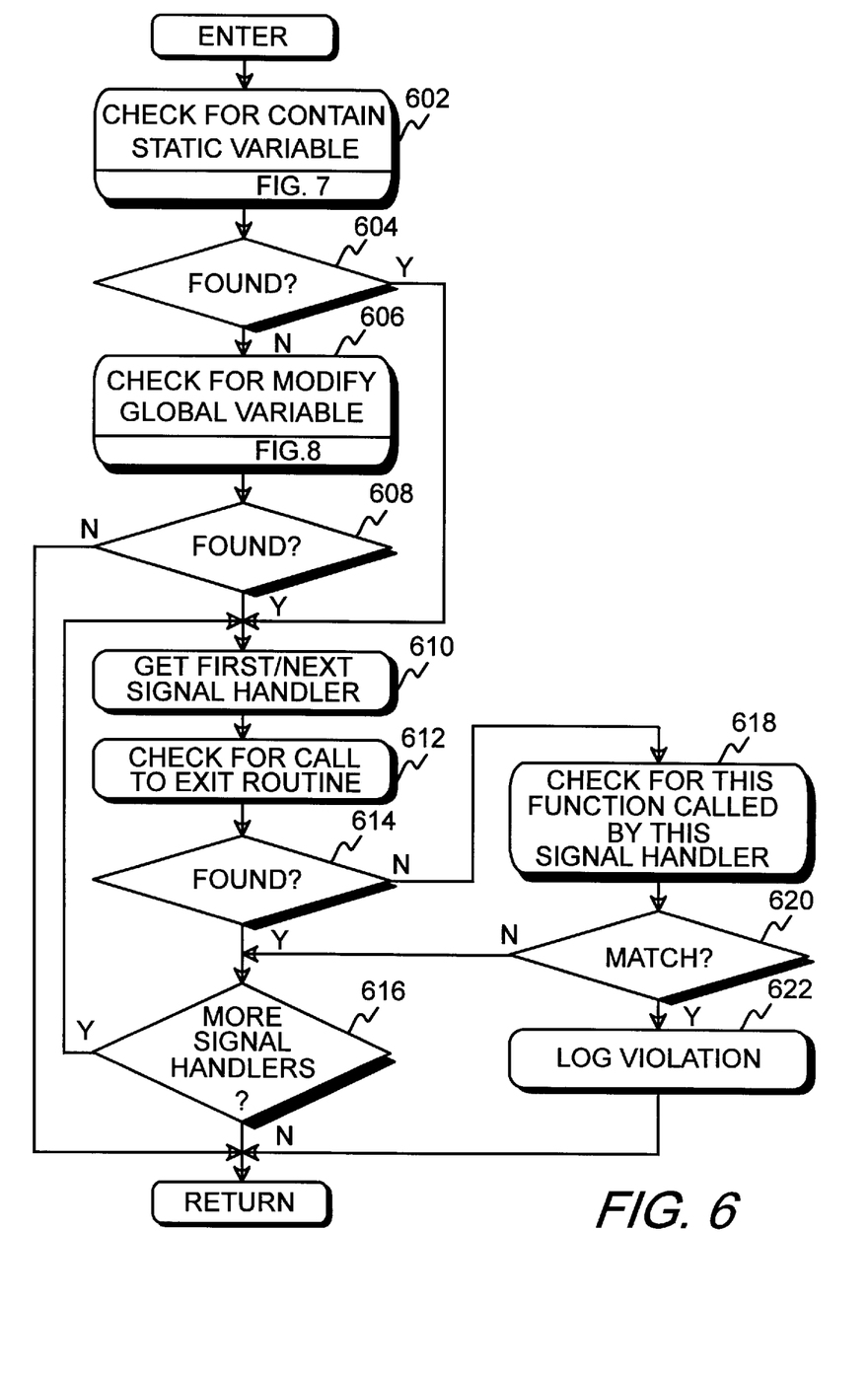
FIGS. 6, 7, and 8 show a flowchart of a method for detecting signal handler routines that call non-reentrant user functions.
Figure 7:
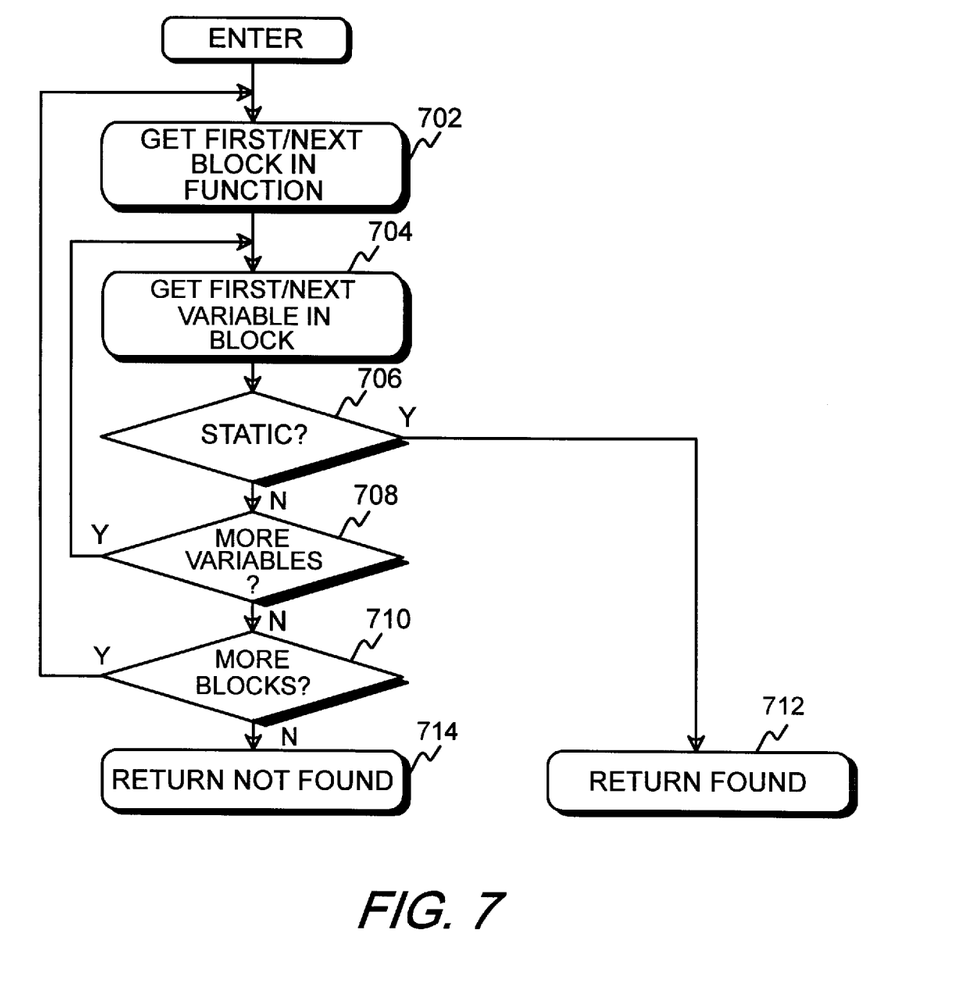
Figure 8:
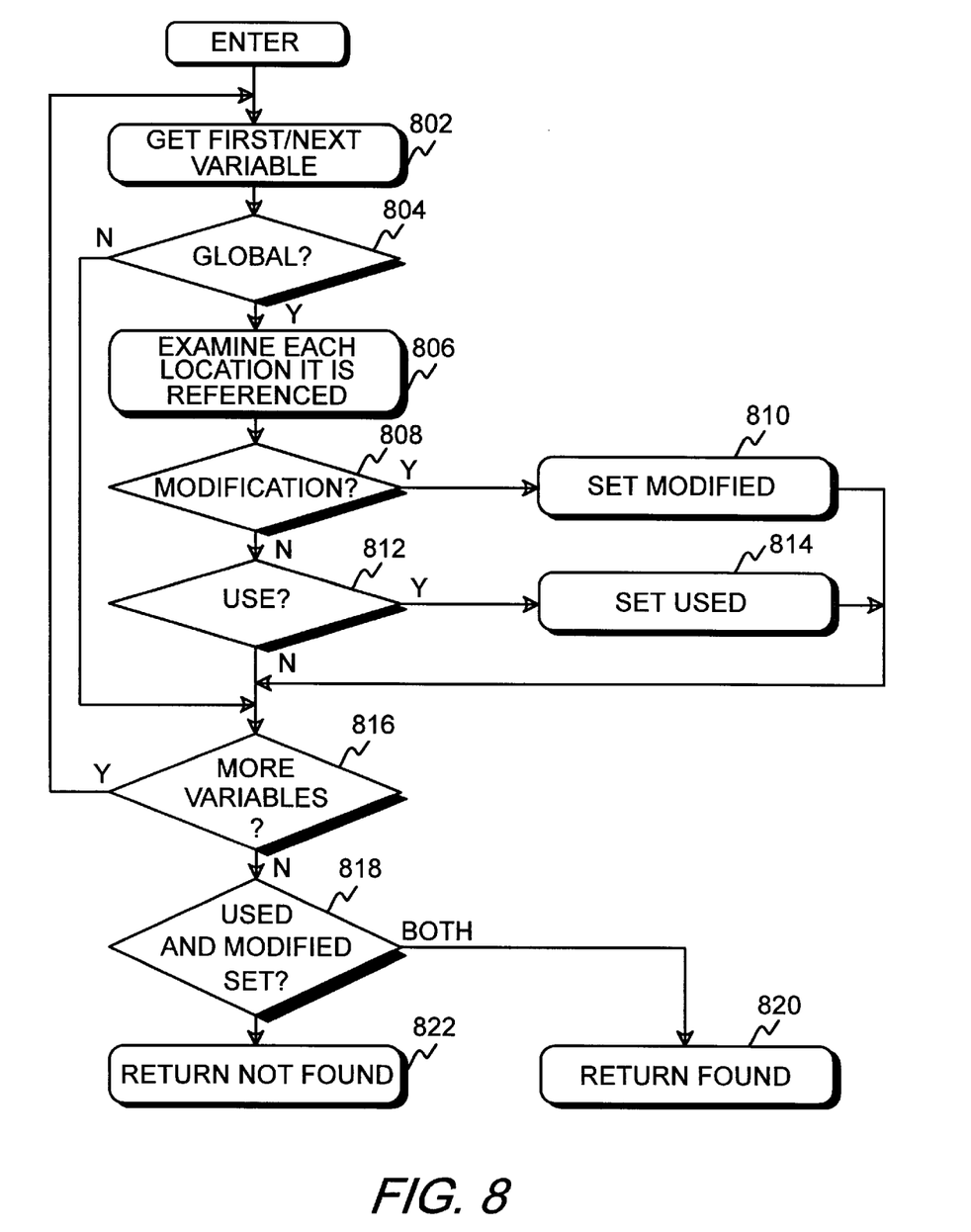

FIGS. 6, 7, and 8 show a flowchart for the rule 218 (FIG. 2) which checks signal handler functions to determine whether they call non-reentrant user functions. Since signal handler functions must be reentrant, they cannot call a non-reentrant user function otherwise the reentrant property will be violated. This rule is called by check engine 202 once for each function definition, whether or not the function is a signal handler function.

Referring now to FIGS. 6, 7, and 8, and specifically to FIG. 6, after entry, block 602 calls FIG. 7 to determine whether any blocks within the function contain any static variables. If any static variables are found, block 604 goes to block 610 to determine if this function is called from a signal handler.

If no static variables are found with any of the blocks, block 604 goes to block 606 which calls FIG. 8 to determine whether this function modifies any global variables. If this function does not modify any global variables, block 608 returns, since this function was not proved to be non-reentrant and no errors will occur if it is interrupted by a signal handler.

If the function modifies global variables, or the function uses static variables, control goes to block 610 to examine all signal handler functions to determine if any signal handler functions call this function. Block 610 gets the first, or next, signal handler function and block 612 determines whether the signal handler function contains a call to an exit routine since if the signal handler exits, no error can occur even if it calls user functions that are non-reentrant. If a call to an exit routine is found, block 614 goes to block 616 to determine if there are more signal handlers to process. If there are more signal handlers to process, block 616 returns to block 610 to get the next signal handler. After all signal handlers have been processed, block 616 returns, since no errors have been found.

If no call to an exit routine is found, block 614 transfers to block 618 which checks to see whether the function being examined is called by this signal handler function and if it is, block 620 logs a violation. If the function is not called by this signal handler function, block 620 goes to block 616 to determine if there are more signal handlers to process. After all signal handlers have been processed, block 616 returns, since no errors have been found.

FIG. 7 shows a flowchart of the routine that determines whether the function contains any static variables. This flowchart is called from block 602 of FIG. 6. Referring now to FIG. 7, after entry, block 702 gets the first or next block within the function and block 704 gets the first or next variable within the block. If the variable is a static variable, block 706 goes to block 712 which returns an indication that a static variable was found within a block of the function. If the variable is not a static variable, block 706 goes to block 708 which determines whether there are more variables within the block and if there are, block 708 returns to block 704 to process the next variable.

After all variables within the block have been processed, block 708 goes to block 710 which determines whether there are more blocks within the function and if there are, block 710 returns to block 702 to process the next block within the function. After all blocks of the function have been processed block 710 goes to block 714 which returns a FALSE indicator to FIG. 6, indicating that no static variables were found.

FIG. 8 shows a flowchart of the check for modifying global variables called from block 606 of FIG. 6. Referring now to FIG. 8, after entry, block 802 gets the first or next variable within the function. Block 804 then determines whether the variable is a global variable. If the variable is not a global variable, block 804 transfers to block 816 to check the next variable.

If the variable retrieved by block 802 is global, block 804 goes to block 806 which examines each location where the variable is referenced within the function. If the variable is modified at a referenced location, block 808 transfers to block 810 which sets a modified flag bit and then transfers to block 816. If the global variable is used at the referenced location, block 812 transfers to block 814 which sets a used flag bit and then transfers to block 816. After the variable has been processed, block 816 determines whether there are more variables to be processed and if there are, returns to block 802 to process the next variable.

After all variables have been processed, block 816 goes to block 818 which determines whether both the used and modified flag bits are set and if both are set, block 818 transfers to block 820 which returns TRUE to FIG. 6, since an error occurred. If only one or neither of the bits is set, block 818 goes to block 822 which returns FALSE to FIG. 6 since no error has occurred.

Figure 9:
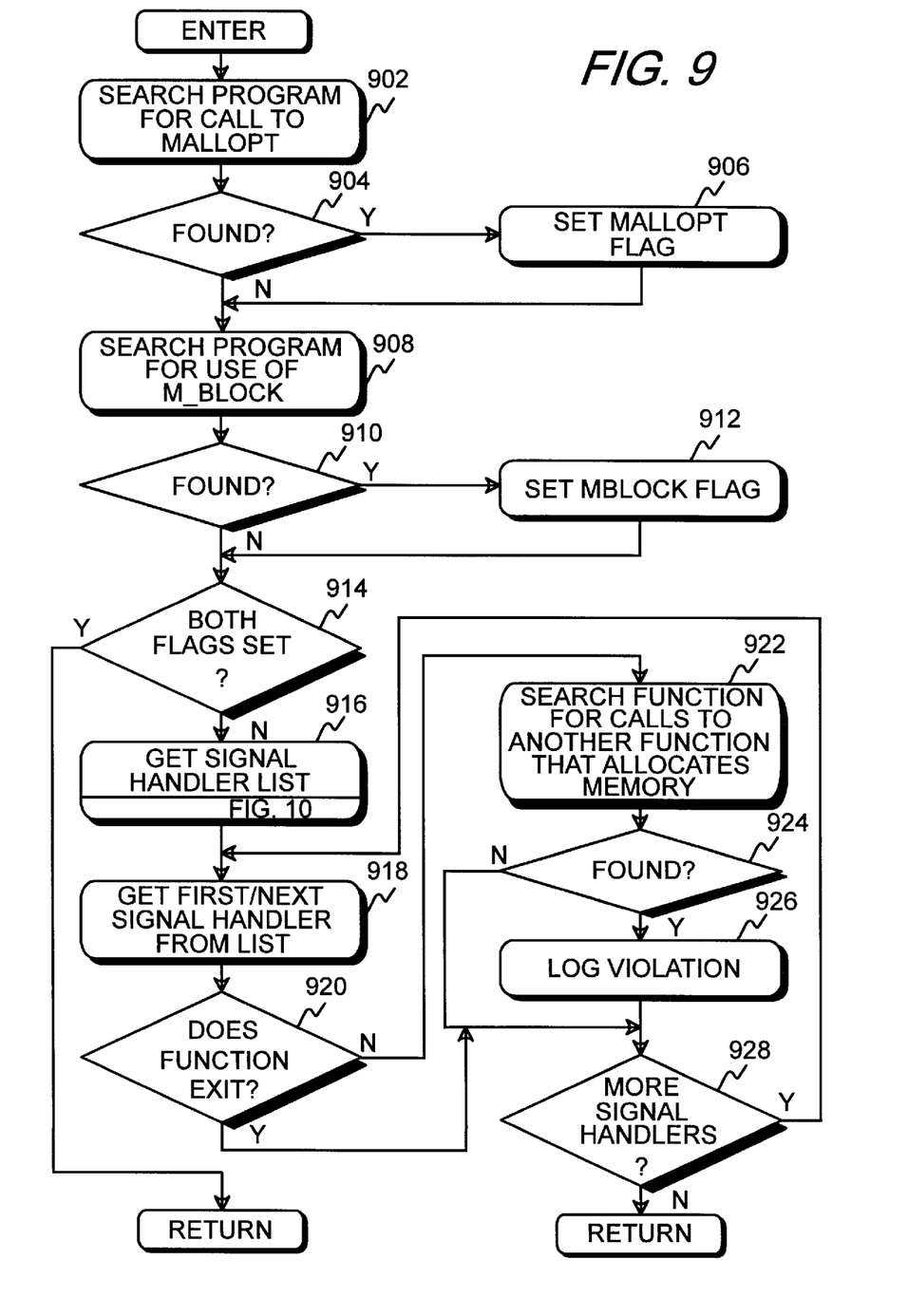
FIG. 9 shows a flowchart of a method for detecting signal handler routines that call a memory allocation function without first protecting the call from interruption by other signal handlers.

FIG. 9 shows a flowchart of the rule 220 (FIG. 2) that checks for functions that call malloc in order to allocate memory from the dynamic memory allocation pool without protecting that call from other interruptions. This rule is also called once by check engine 202. Referring now to FIG. 9, after entry, block 902 searches the program to determine whether there is a call to the function mallopt and if one is found, block 904 transfers to block 906 which sets a flag indicating that mallopt has been called. Block 908 then searches the program for the use of the M_BLOCK macro and if this is found, block 910 transfers to block 912 which sets the M_BLOCK flag.

When the malloc function is called to get memory from the dynamic memory allocation pool, other interruptions must be protected during the call to malloc, otherwise, memory can be lost if another interruption occurs and this signal handler is called again. The call to malloc can be protected by calling the function mallopt while also using the M_BLOCK macro, as defined within the UNIX operating system. Thus, if a function calls mallopt and also uses the M_BLOCK, the present invention assumes that the function is correctly protecting the call to malloc. Therefore, if both the mallopt flag and the M_BLOCK flag are set, block 914 simply returns to the caller, since the assumption is made that the program is protecting the call to malloc correctly.

If either flag is set, the program may not be protecting calls to malloc, so the signal handler functions within the program are checked. To check the signal handlers, block 914 goes to block 916 which calls FIG. 10 to get a list of signal handler functions. Block 918 then gets the first, or next, signal handler function from the list for processing. Block 920 determines whether the signal handler function exits. If the signal handler function exits during processing, there is no need to protect the call, therefore, if the function exits, block 920 goes to block 928 to process the next signal handler function.

If the function does not exit, block 920 goes to block 922 which searches the function to determine whether it calls any library functions that are known to use malloc. This list of library functions is determined by examining the documentation, called "man" pages, of all the library functions available, and listing the names of those that are documented to call the malloc function. If the function does call a library function that obtains memory from the dynamic memory allocation pool by calling malloc, block 924 goes to block 926 to log a violation. Otherwise, block 924 goes to block 928 to check the next signal handler. After all signal handlers have been processed, block 928 returns to the caller.

Figure 10:
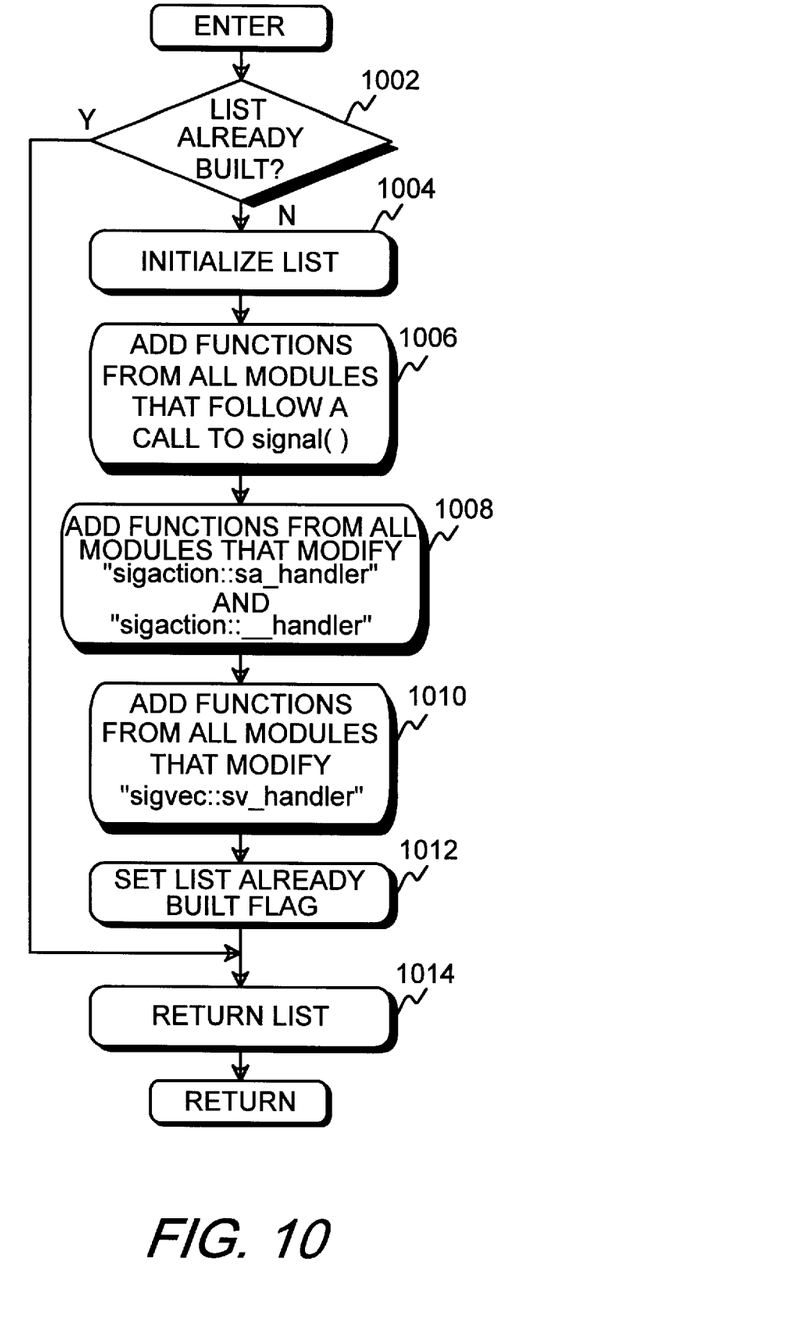
FIG. 10 shows a flowchart of a method for finding signal handler functions.

FIG. 10 shows a flowchart of the signal handler list function 204 (FIG. 2) that finds signal handler functions. Referring to FIG. 10, after entry, block 1002 determines whether the list has already been created by a previous call to this function. If the list has previously been created, block 1002 goes to block 1014 to return the existing list.

If the list has not been previously created, block 1002 goes to block 1004 where the list is initialized. Block 1006 then finds all functions that follow calls to the function signal(), since functions that call the function "signal" must be signal handler functions. Block 1006 then adds these functions to the list of signal handler functions.

Block 1008 adds all functions that modify "sigaction::sa_ handler" or "sigaction::_handler", since these functions are also signal handler functions.

Block 1010 adds all functions that modify "sigvec::sv_ handler", since these functions are also signal handler functions.

Block 1012 then sets a flag indicating that the list has been built, and then block 1014 returns the list to the caller.

Figure 11:
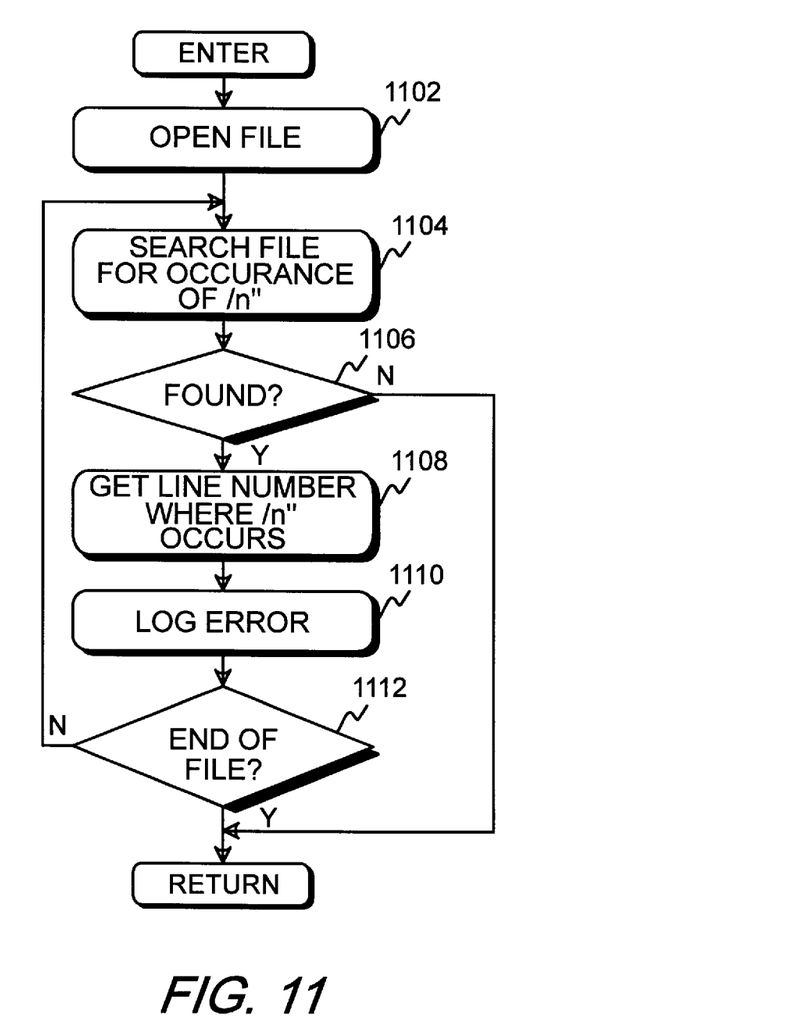
FIG. 11 shows a flowchart of a method for detecting an improper end of line termination.

FIG. 11 shows a flowchart of the rule 224 (FIG. 2) that checks for a function using an improper end of line termination. Within a character string, the C programming language will substitute a proper line termination character when a "\n" is encountered. A common mistake is to use the "/" in place of the "\" for the end of line termination. This rule checks to see if this has occurred within a program and if it has, warns the programmer of a potential error.

Referring to FIG. 11, block 1102 opens the source code 212 (FIG. 2) for the file being examined and block 1104 searches the entire source code file for an occurrence of '/n' followed by a double quote character. If no occurrences of this sequence are found, block 1106 returns to the caller since there is no potential error. If an occurrence of /n followed by a double quote character is encountered, block 1106 goes to block 1108 which gets the line number where the sequence occurs, and then block 1110 logs an error indicating the line number. Block 1112 then determines whether end of file has occurred and if not, transfers back to block 1104 to continue the search for additional occurrences of "/n" followed by a quote character. After the end of file has been reached, block 1012 returns to the caller.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for indicating logical errors within a computer program, said method comprising the steps of:

(a) building a list of signal handler functions contained within said computer program;

(b) for each function in said list built in step (a) performing the following steps (b1) through (b4)

(b1) searching all symbols of said signal handler function for both a use of a global error variable and a modification of said global error variable;

(b2) when step (b1) finds both a use and a modification of said global error variable. returning an indication of no potential error;

(b3) searching said signal handler function for a call to a second function that modifies said global error variable; and (b4) when step (b3) finds a call to said second function that modifies said global error variable, warning of a potential error in said signal handler function;

(c) retrieving a symbol contained within said computer program;

(d) matching a kind of said symbol with a kind of symbol processed by each rule of a plurality of rules;

(e) when said kind of said symbol matches a kind of symbol processed by a selected rule of said plurality of rules, performing said selected rule for said symbol;

(f) when said selected rule indicates that a potential error is present within said computer program, warning of a potential error in said computer program.

2. The method of claim 1 wherein step (b) further comprises the following step (b1a) performed before step (b1):

(b1a) examining all symbols within said signal handler function exits to an operating system, returning an indication of no potential error.

3. The method of claim 1 further comprising the following steps (a1), (a2) and (a3) performed before step (a):

(a1) examining each function within a library of functions and creating a non-reentrant list containing each function within said library that is not a reentrant functions;

(a2) building a signal handler function list of signal handler functions contained within said computer program;

(a3) for each signal handler function in said signal handler function list, performing the steps of:

(a3a) searching said signal handler function for a call to a second function contained in said nonreentrant list; and (a3b) when step (a3a) finds a call to said second function, warning of a potential error in said signal handler function.

4. The method of claim 3 wherein step (a1) further comprises the step of locating each function within said library that defines a static variable and adding each said function to said non-reentrant list.

5. The method of claim 3 step (a3) further comprises the following step (a3a1) performed before step (a3a):

(a3a1) examining all symbols within said signal handler function, and when said signal handler function exits to an operating system, selecting a next signal handler function from said signal handler function list.

6. The method of claim 1 wherein step (e) comprises the steps of:

(e1) when said kind of said symbol is a function, performing the steps of (e1a) searching said function for programming statements that indicate that said function is not a reentrant function, (e1b) searching all symbols of said function for a modification of a global variable, (e1c) when step (e1a) finds no indication that said function is not a reentrant function, and step (e1b) finds no modification of a global variable, returning an indication of no potential error, (e1d) locating all signal handler functions within said computer program, (e1e) searching each of said signal handler functions located in step (e1d) for a call to said function, and (e1f) when step (e1e) finds a signal handler function that calls said function, warning of a potential error in said function.

7. The method of claim 6 wherein step (e1a) further comprises the step of examining said function, and when a programming statement is that defines a static variable is found within said function, indicating that said function is not a reentrant function.

8. The method of claim 6 wherein step (e1b) further comprises the following step (e1b1) and step (e1c) comprises the following step (e1c):

(e1b1) searching all symbols of said function for a modification of a static variable; and (e1c) when step (e1a) finds no indication that said function is not a reentrant function, and step (e1b) finds no modification of a global variable, and step (e1b1) finds no modification of a static variable, returning an indication of no potential error.

9. The method of claim 6 wherein step (e1d) further comprises the step of:

(e1d1) examining all symbols within each signal handler function located, and when a located signal handler function exits to an operating system, locating a next signal handler function within said computer program.

10. The method of claim 1 wherein step (e) comprises the steps of:

(e1) examining each function within a library of functions and creating a heap function list of functions within said library that allocate memory from a heap;

(e2) searching said program for statements that prevent an error when a call is made to allocate memory from said heap;

(e3) when step (e2) finds statements within said program that prevent an error when a call is made to allocate memory from said heap, indicating no potential error;

(e4) building a list of signal handler functions contained within said computer program; and (e5) for each function in said list built in step (e4), performing the steps of (e5a) searching said signal handler function for a call to a second function contained in said heap function list, and (e5b) when step (e5a) finds a call to said second o function, and step (e2) did not find statements that prevent an error when a call is made to allocate memory from said heap, warning of a potential error in said signal handler function.

11. The method of claim 1 wherein step (e) comprises the steps of:

(e1) when said kind of said symbol is a function, performing the steps of:

(e1a) searching all character strings of said function to find a character string containing a three character sequence comprising the characters '\n' followed by a quote character;

(e1b) when step (e1a) finds a character string containing said three character sequence, warning of a potential error within said function.

12. A method for indicating logical errors within a computer program, said method comprising the steps of:

(a) building a list of signal handler functions contained within said computer program;

(b) for each function in said list built in step (a), performing the steps of:

(b1) searching all symbols of said signal handler function for both a use of a global error variable and a modification of said global error variable;

(b2) when step (b1) finds both a use and a modification of said global error variable, returning an indication of no error;

(b3) searching said signal handler function for a call to a second function that modifies said global error variable; and (b4) when step (b3) finds a call to said second function that modifies said global error variable, warning of a potential error in said computer program.

13. The method of claim 12 wherein step (b) further comprises the following step (b1a) performed before step (b1):

(b1) examining all symbols within said signal handler function, and when said signal handler function exits to an operating system, outputting an indication of no potential error.

14. A method for indicating logical errors within a computer program, said method comprising the steps of:

(a) examining each function within a library of functions and creating a non-reentrant list containing each function within said library that is not a reentrant function;

(b) building a signal handler function list of signal handler functions contained within said computer program; and (c) for each signal handler function in said signal handler function list, performing the steps of (c1) searching said signal handler function for a call to a second function contained in said nonreentrant list, and (c2) when step (c1) finds a call to said second function, warning of a potential error in said computer program.

15. The method of claim 14 wherein step (a) further comprises the step of locating each function within said library that defines a static variable and adding each said function to said list.

16. The method of claim 14 step (c1) further comprises the following step (c1a) performed before step (c1):

(c1a) examining all symbols within said signal handler function, and when said signal handler function exits to an operating system, selecting a next signal handler function from said signal handler function list.

17. A method for indicating logical errors within a computer program, said method comprising the steps of:

(a) retrieving a symbol contained within said computer program; and (b) when a kind of said symbol is a function, performing the steps of (b1) searching said function for programming statements that indicate that said function is not a reentrant function, (b2) searching all symbols of said function for a modification of a global variable, (b3) when step (b1) finds no indication that said function is not a reentrant function, and step (b2) finds no modification of a global variable, continuing with step (a), (b4) locating all signal handler functions within said computer program, (b5) searching each of said signal handler functions found in step (b4) for a call to said function, and (b6) when step (b5) finds a signal handler function that calls said function, warning of a potential error in said computer program.

18. The method of claim 17 wherein step (b1) further comprises the step examining said function, and when a programming statement that defines a static variable is found within said function, indicating that said function is not a reentrant function.

19. The method of claim 17 wherein step (b2) further comprises the following step (b2a) and step (b3) comprises the following step (b 3):

(b2a) searching all symbols of said function for a modification of a static variable; and (b3) when step (b1) finds no indication that said function is not a reentrant function, and step (b2) finds no modification of a global variable, and step (b2a) finds no modification of a static variable, continuing with step (a).

20. The method of claim 17 wherein step (b4) further comprises the step of examining all symbols within each signal handler function located, and when a located signal handler function exits to an operating system, locating a next signal handler function within said computer program.

21. A method for indicating logical errors within a computer program, said method comprising the steps of.

(a) examining each function within a library of functions and creating a function list of each function within said library that allocates memory from a dynamic resource allocation pool;

(b) searching said program for statements that prevent an error when a call is made to allocate memory from said dynamic resource allocation pool;

(c) when step (b) finds statements within said program hat prevent an error when a call is made to allocate memory from said dynamic resource allocation pool, indicating no potential error;

(d) building a signal handler list of signal handler functions contained within said computer program; and (e) for each signal handler function in said signal handler list, performing the steps of:

(e1) searching said signal handler function for a call to a second function contained in said function list; and (e2) when step (e1) finds a call to said second function, and step (c) did not find statements that prevent an error when a call to allocate memory from said dynamic resource allocation pool, warning of potential error in said computer program.

* * * * *

UNITED STATES PATENT AND TRADEMARK OFFICE
CERTIFICATE OF CORRECTION

PATENT NO. : 5,857,070  
DATED : January 5, 1999  
INVENTOR(S) : Wade Satterfield et al.

It is certified that error appears in the above-identified patent and that said Letters Patent is hereby corrected as shown below:

Column 8,  
Line 63, after "(a)" insert -- , --

Column 9,  
Line 24, after "function" insert -- , and when said signal handler function --  
Line 30, delete "functions" and insert therefor -- function --  
Line 38, delete "nonreentrant" and insert therefor -- non-reentrant --

Column 10,  
Line 18, after "step" do not begin a new line  
Line 46, after "second" delete "o"  
Line 57, delete " '\n' " and insert therefor-- '/n' --

Column 11,  
Line 15, before "examining" delete "(b1)" and insert therefor -- (b1a) --  
Line 27, after "of" begin a new line  
Line 29, delete "nonreentrant" and insert therefor-- non-reentrant --

Column 12,  
Line 1, delete "all" and insert therefor -- each --  
Lines 1 and 3, delete "functions" and insert therefor -- function --  
Line 3, after "each" delete "of"  
Line 16, delete "(b 3)" and insert therefor -- (b3) --  
Line 31, delete "of." and insert therefor -- of: --  
Line 40, delete "hat" and insert therefor -- that --

Signed and Sealed this

Second Day of September, 2003

JAMES E. ROGAN  
*Director of the United States Patent and Trademark Office*